Jan. 13, 1959  J. L. MARYANSKI ET AL  2,868,550
COLLET
Filed Oct. 3, 1956
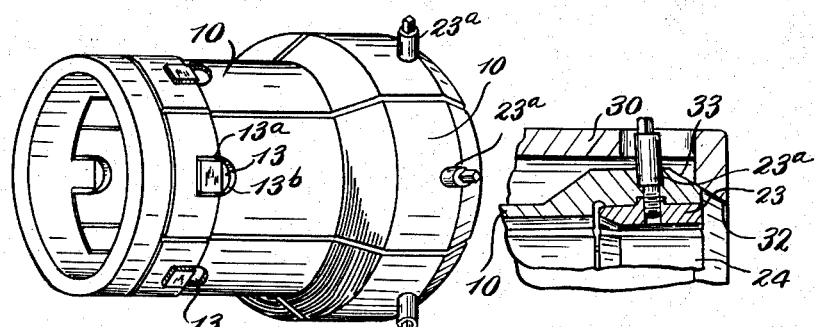
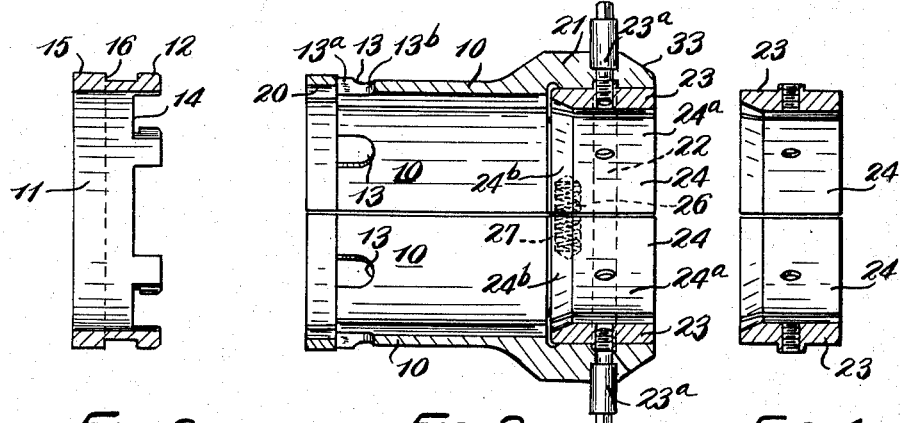
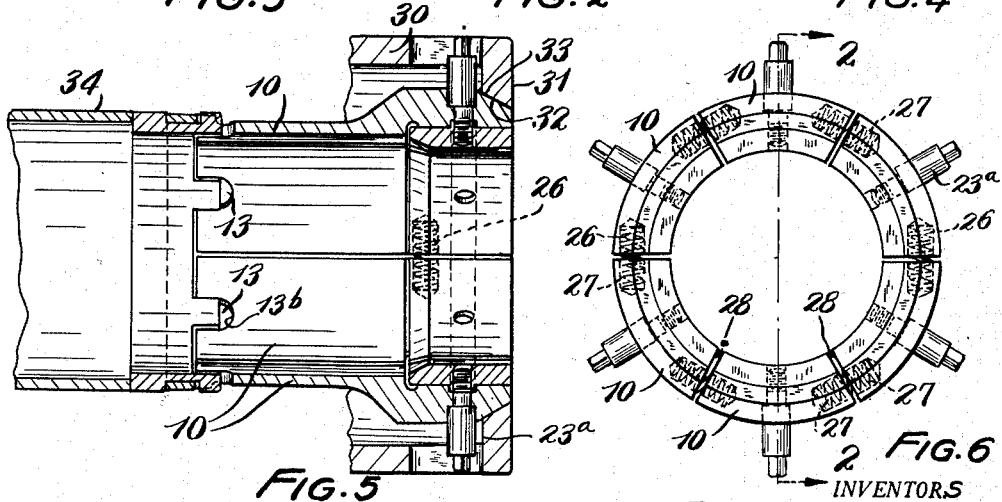
INVENTORS
JOHN L. MARYANSKI
BY MICHAEL L. VALENTINO
ATTORNEY

United States Patent Office 2,868,550
Patented Jan. 13, 1959

2,868,550

COLLET

John L. Maryanski, Garfield Heights, and Michael L. Valentino, Cleveland Heights, Ohio, assignors to Bardons & Oliver, Inc., Cleveland, Ohio, a corporation of Ohio Application October 3, 1956, Serial No. 613,790

2 Claims. (Cl. 279—50)

The present invention relates to a collet type gripping mechanism, or chuck, for releasably clamping and holding a bar-like member. Such chucks or gripping mechanisms may be used with various machines and tools, for example, in turret lathes, cut off machines, automatic multiple spindle machine tools and the like, for releasably clamping bar stock which is fed periodically by the machine into a position to be machined, or in various tool devices for releasably gripping the shank of a tool or tool arbor.

The principal object of the present invention is to provide a new and improved gripping device of the type set forth which includes a plurality of fingers, preferably rigid fingers, defining an annular work gripping member, and supported in a novel manner which permits the gripping device to be readily assembled and which allows the fingers increased freedom of movement for self aligning purposes and for movement between a released and a gripping position.

Another object of the present invention is to provide a collet type work gripping device, or chuck, in which a plurality of fingers, preferably rigid fingers, are arranged to form a generally annular gripping member comprised of axially extending finger sections which are movable relatively to each other and which are each biased in a direction away from the adjacent sections by springs positioned therebetween and in which the fingers are connected at one end to the associated mechanism by means which permit lateral, pivotal, cocking, and axial movement of the fingers.

Another object of the present invention is to provide a collet chuck having a plurality of rigid fingers which are connected to their supporting mechanism by a lug which is received in an oversize opening in the fingers adjacent their inner end, the chuck preferably being biased to a releasing position by springs interposed between adjacent fingers.

The present invention resides in certain constructions and arrangements and combinations of the parts thereof and further objects and advantages thereof will be apparent from the following detailed description of the preferred embodiment thereof made with reference to the accompanying drawing forming a part of this specification for all matter shown therein, whether or not expressly described, and in which:

Figure 1 is a perspective view of a collet device embodying the present invention;

Figure 2 is a longitudinal sectional view through the collet fingers of the device of Figures 1 and 6, the section being taken along line 2—2 of Figure 6;

Figure 3 is a detached sectional view of a connecting ring for the collet fingers;

Figure 4 is a detached sectional view of parts of the device for engaging the member to be held;

Figure 5 is a longitudinal sectional view of the collet device of Figure 1 together with the clamp ring and support for the device and showing the mechanism in a clamping position;

Figure 6 is an end elevational view of the collet fingers shown in Figure 2; and Figure 7 is a fragmentary sectional view of the mechanism of Figure 5 but showing the mechanism in a releasing position.

Referring to the drawings, the collet type gripping mechanism shown therein comprises a plurality of collet fingers 10 which are curved in transverse cross section and are arranged to form a generally annular gripping member for clamping a bar or similar member positioned in the annular member. The collet fingers 10 are connected together in assembled relationship by a hinge ring 11 which carries an individual lug 12 for each finger, each lug being received in an aperture 13 in the corresponding finger adjacent one end thereof, hereinafter referred to as the inner end of the finger.

The lugs 12 are equally spaced from each other about the hinge ring 11 and extend both axially and radially outwardly from an edge 14 of the ring. The end portion 15 of the ring 11 opposite the end from which the lugs 12 extend is of increased thickness to provide an annular shoulder 16 adjacent the inner ends of the assembled fingers 10. The height of shoulder 16 is preferably approximately the same as the height of the lugs 12.

The lugs 12 are shown as generally square in configuration and the apertures 13 each have a generally rectangular portion 13ª for receiving the corresponding lug. The portions 13ª of the apertures 13, however, are oversized to permit axial and lateral movement of fingers 10. In addition to the rectangular portions 13ª, the apertures 13 each comprise an arc shaped portion 13ᵇ extending axially from the rectangular portion toward the outer end of the finger. The arc portions of the aperture 13 facilitate assembly of the fingers and their rocking movement on the lugs 12.

The inner end portions of the fingers 10 are internally recessed from the apertures 13 to the inner end of the fingers as indicated at 20 to permit the fingers to seat on the ring 11 with the lugs 12 in the apertures 13. Preferably the outer side of inner end portions of the fingers flare outwardly beginning at rectangular portions 13ª of the apertures to provide the necessary metal to permit the internal recess 20 to be formed. With this construction and with the recess 20 of a depth equal to the thickness of the edge 14 of the ring 11, the internal sides of the ring and fingers will be substantially flush with each other.

The outer or nose ends of the collet fingers each have an external raised portion 21 and an internal recess 22 adjacent the outer edge of the finger. The internal recess 22 of each finger forms a seat for receiving an element 23 for engaging the member to be clamped. The elements 23 are removably supported by screws 23ª which are supported in bores in the raised portions 21 and which thread into the elements. The elements 23 are also curved in transverse cross section so as to seat properly in the fingers 10 and each element has a side 24 facing inwardly of the annular member defined by the fingers 10. The sides 24 each comprise a portion 24ª for engaging the member to be clamped, together with a tapered portion 24ᵇ. The portions 24ª are offset inwardly of the annular member with respect to the internal sides of the fingers 10 and the portions 24ᵇ taper from the surface portions 24ª to the inner edges of the elements 23 to points adjacent the internal sides of the fingers 10.

The annular member defined by the fingers 10 is biased to an expanded position by springs 26 interposed between adjacent fingers. Each finger 10 has a bore 27 opening into each radial edge 28 thereof and extending generally perpendicular thereto with each bore being aligned with the bore in the adjacent edge of the adjacent finger.

Each pair of adjacent aligned bores has one of the compressed biasing springs 26 therein.

To contract the annular member to a gripping position a clamp ring 30 is utilized. The clamp ring 30 is positioned about the fingers 10 and has an inwardly extending radial flange 31 formed with an inclined edge 32 adapted to slidably engage a tapered cam surface 33 on the outer end of the raised portions 21 to move the fingers 10 radially inwardly when the clamp ring and fingers are relatively moved to cause the edge 32 to ride onto the cam surface 33. In Figure 5 the collet mechanism of Figure 1 is shown in assembled relationship with the clamp ring and with a tubular member 34 for mounting the hinge ring 11 and the clamp ring is shown in its position where the fingers 10 are in gripping positions.

The described collet type gripping mechanism is susceptible of various uses and in various types of machines and tools to grip a bar like member to be releasably clamped in a certain position. For example, the tubular member 34 could be a feed tube within the spindle of a turret lathe, a cutting off machine, automatic multiple spindle machine tools and the like, the ring 11 being operated to a released position each time the bar stock was to be fed forward and then clamped.

It can now be seen that the objects hereto enumerated and others have been accomplished and that a collet type gripping mechanism has been provided having collet fingers, preferably rigid fingers, which define an annular expansible and contractible member for clamping a bar-like member, which fingers may move in a plurality of directions relative to their connecting means to assure proper alignment and seating. The fingers may also be readily assembled and disassembled and are provided with jaw elements that are readily removable and interchangeable.

While the preferred embodiment of the present invention has been described in considerable detail, it is our intention to cover all modifications, constructions and arrangements which fall within the ability of those skilled in the art and scope of the appended claims.

We claim:

1. A collet type gripping mechanism comprising a plurality of transversely curved fingers arranged to define an annular member, a ring adjacent one end of said respective fingers, said ring having an external radial shoulder extending about its periphery immediately outwardly of said one end of said fingers and a portion extending into the annular member, said portion including a radially extending lug adjacent each respective finger with each of said lugs being received in an oversized recess in the adjacent finger, biasing means adjacent the other end of said fingers and yieldably urging said fingers in a direction to expand said annular member, and means for moving the fingers inwardly against said biasing means.

2. A collet type gripping device comprising a plurality of fingers, means adjacent one end of said fingers interconnecting the latter and comprising a relatively fixed lug for each finger, said lugs being received in individual oversized elongate openings in the respective fingers, work gripping members detachably carried by said fingers at their opposite ends, said fingers being provided with an inner annular recess at said opposite ends, said members having portions engaging said recess, and means carried by each of said members for removably securing the same to said respective fingers, biasing means yieldably urging said fingers in a spreading direction, and means for moving the fingers in opposition to the biasing means and for holding the fingers and members in a gripping position, said last named means having openings opposite said member securing means to provide easy access thereto.

References Cited in the file of this patent

UNITED STATES PATENTS

| 75,870 | Daboll | Mar. 24, 1868 |
| 363,431 | Stearns et al. | May 24, 1887 |
| 1,582,445 | Border | Apr. 27, 1926 |
| 1,657,615 | Cone | Jan. 31, 1928 |
| 2,548,978 | Jelinek | Apr. 17, 1951 |
| 2,695,096 | Gridley | Nov. 23, 1954 |
| 2,777,703 | Pickett et al. | Jan. 15, 1957 |

FOREIGN PATENTS

| 398,951 | Germany | July 29, 1924 |
| 134,076 | Sweden | Dec. 27, 1951 |